United States Patent Office 3,350,351
Patented Oct. 31, 1967

3,350,351
ORGANOSILICON COMPOSITIONS AND METHODS OF PREPARATION AND VULCANIZATION THEREOF
Darryl T. Hansen and Thomas D. Talcott, Midland, Mich., assignors to Dow Corning Corporation, Midland, Mich., a corporation of Michigan
No Drawing. Filed June 27, 1966, Ser. No. 560,792
14 Claims. (Cl. 260—46.5)

ABSTRACT OF THE DISCLOSURE

A curable composition which can be molded, shaped and handled in a fluid state at temperatures in excess of 100° C. without scorching. The curable composition is a mixture of an organosilicon polymer having at least 0.01 percent of the total organic groups as ethylenically unsaturated groups and at least 0.1 weight percent based on the organosilicon polymer of a catalyst of the formula

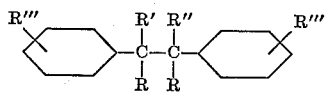

where R is hydrogen,

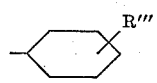

methyl or ethyl; R' is methoxy, ethoxy or acetoxy; R" is methyl, hydrogen, methoxy, ethoxy or acetoxy and R''' is hydrogen, phenyl, halogen, methoxy, ethoxy or alkyl having 1 to 6 carbon atoms. Vulcanization can be obtained by mixing the organosilicon polymer and the catalyst when the mixture is fluid and the half life of the catalyst is greater than three minutes and then heating the mixture above the mixing temperature.

---

This invention relates to novel compositions of silicon containing polymers which have vinyl unsaturation and a high temperature vulcanizing agent and to a method of vulcanizing the composition.

It is often desirable to vulcanize silicon-containing polymers at high temperatures, such as above 150° C. Also, it is desirable to prepare compositions which contain silicon-containing polymers at temperatures as high as 150° C. or in some cases even higher temperatures are desirable, such as 175° C. Organic peroxides, such as dicumyl peroxide or 2,4-dichlorobenzoylperoxide are not satisfactory as vulcanization catalysts at temperatures above 150° C. when the compositions are to be prepared at temperatures from 100° C. to 150° C. or higher, because the dicumyl peroxide and 2,4-dichlorobenzoylperoxide are activated at temperatures ranging from 90° to 120° C. Thus, if one desired to formulate an organosilicon elastomer at 140° C. in the presence of dicumyl peroxide or 2,4-dichlorobenzoylperoxide, the composition would be vulcanizing while one attempted to mix the ingredients, and no useful product would be obtained. The property of vulcanizing during the formulation of the composition or while handling the uncured composition is known in the art as scorching. The reasons one would want to formulate a silicon-containing elastomer composition at temperatures in the range of 140° C. to 175° C. are obvious to those skilled in the art of silicone chemistry. Some of the reasons are: The silicon-containing polymers are of high viscosity or are crystalline and will not mix well with the vulcanization catalyst, filler or the like to form homogeneous mixtures which are desirable when uniform properties are sought in the cured composition. Likewise, many organosilicon resins require solvents to fluidize them such that vulcanization catalysts can be added, because the catalysts normally used begin curing at low temperatures below the melting point of many of the resins. One is, therefore, limited to the range of silicon-containing polymers which can be used, such as silicon-containing polymers having viscosities which are millable at low temperature. If silicon-containing polymers are used which have high viscosities or which are crystalline, additional operations must be used to make organosilicon compositions. Some of the additional operations include adding solvents which are undesirable, or mixing in the vulcanization catalyst at low temperatures after the other ingredients have been mixed. Solvents make additional steps in the process, thus adding to the cost. Mixing in the vulcanization catalyst last and at low temperature results in incomplete mixing of the vulcanization catalyst and irregular properties in the cured product. It is, therefore, obvious that a new technique for the preparation of organosilicon compositions or new catalyst are needed, so that the high molecular weight, high viscosity and crystalline silicon-containing polymers can be used to provide useful products.

It is known in the prior art that ethylenically unsaturated organic monomers can be polymerized by diphenylethane compounds of the formula:

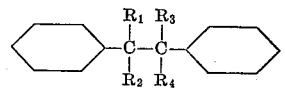

where each of $R_1$, $R_2$, $R_3$ and $R_4$ are hydrogen atoms or alkyl radicals containing up to 4 carbon atoms and at least two of the R's are alkyl radicals. These diphenyl ethanes are activated and will polymerize styrene at 125° C. These diphenyl ethane polymerization catalysts are disclosed in U.S. Patent Nos. 3,066,115 and 3,125,546. Although these diphenyl ethane catalysts are useful for polymerizing ethylenically unsaturated organic monomers, they are of no value in vulcanizing silicon-containing polymers. In fact, these diphenyl ethanes will not vulcanize silicon-containing polymers with or without ethylenic unsaturation, even at temperatures up to 250° C.

An object of this invention is to provide a composition comprising a silicon-containing polymer and a vulcanization catalyst which can be readily compounded into an organosilicon composition at high temperatures and which can be vulcanized at high temperatures. Another object is to provide a method of compounding and vulcanizing the composition into a cured product. These and other objects and advantages are apparent from the following detailed description of this invention.

This invention relates to a curable composition comprising
(A) a silicon containing polymer having per silicon atom an average of at least 1 monovalent organic radical wherein each of said monovalent organic radicals is selected from the group consisting of hydrocarbon radicals, halogenated hydrocarbon radicals and cyanoalkyl radicals, the silicon atoms being linked by divalent radicals selected from the group consisting of oxygen atoms, hydrocarbon radicals and halogenated hydrocarbon radicals and at least 0.01 percent of the total monovalent organic radicals being ethylenically unsaturated, and
(B) a catalyst in an amount of at least 0.01 weight percent based on the weight of (A) of the formula

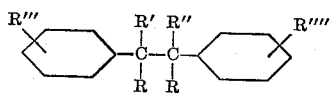

wherein each

R is a monovalent radical individually selected from the group consisting of a hydrogen atom, a

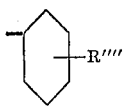

radical, a methyl radical and an ethyl radical,

R' is a monovalent radical selected from the group consisting of a methoxy radical, an ethoxy radical and an acetoxy radical, R'' is a monovalent radical selected from the group consisting of a hydrogen atom, a methoxy radical, an ethoxy radical and an acetoxy radical, and each R''' is a monovalent radical individually selected from the group consisting of a hydrogen atom, a phenyl radical, a halogen atom, a methoxy radical, an ethoxy radical and an alkyl radical of from 1 to 6 carbon atoms.

The silicon-containing polymers (A) can be any of the conventional silicon-containing polymers as long as at least 0.01 percent of the total monovalent organic radicals bonded to the silicon atoms are ethylenically unsaturated. The polymers of this composition are well known in the art and the methods of preparing these polymers are well known in the art. Many of the polymers can be purchased commercially.

The silicon-containing polymers of this invention have monovalent organic radicals bonded to the silicon atoms. The number of monovalent organic radicals per silicon atom range from an average of at least 1 up to 4. These silicon-containing polymers are composed of silicon-containing units with 1, 2, 3 or 4 organic radicals per silicon atom bonded through silicon-carbon bonds. Limited amounts of $SiO_2$ units are also within the scope of this invention.

The silicon-containing polymers can be homopolymers, copolymers, mixtures of homopolymers, mixtures of copolymers, mixtures of homopolymers and copolymers and any of the foregoing with monomers or dimers.

The silicon-containing polymers can be composed of silicon-containing units of the formulae $R°SiX_{3/2}$, $R°_2SiX_{2/2}$, $R°_3SiX_{1/2}$, $R°_4Si$ or $SiX_{4/2}$ wherein $R°$ is a monovalent organic radical selected from the group consisting of hydrocarbon radicals, halogenated hydrocarbon radicals and cyanoalkyl radicals and X is a divalent radical selected from the group consisting of oxygen atoms, hydrocarbon radicals and halogenated hydrocarbon radicals. The divalent radicals are bonded to other silicon atoms and if X is a divalent oxygen atom, it can also be bonded to hydrogen or organic groups to form groups such as, HO—, R°O—

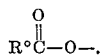

When the average number of monovalent organic radicals per silicon atom ranges from 1 to 1.9, the organosilicon composition is usually a resinous material and when the number of monovalent organic radicals per silicon atom ranges from 1.9 to 2.1, the organosilicon composition is an elastomeric material.

The range of monovalent organic radicals per silicon atom from 1.9 to 3 can range from resinous to elastomeric products depending upon the number of ethylenically unsaturated monovalent organic radicals per total number of monovalent organic radicals.

When the ethylenically unsaturated monovalent organic radicals is from 0.01 to 0.05 percent of the total number of the monovalent organic radicals, the cured product is a loosely crosslinked material which would range from a potting compound to a soft elastomer. When the ethylenically unsaturated monovalent organic radicals are from 0.05 to 1 percent of the total number of the monovalent organic radicals, the cured product is an elastomer. When the percentage of ethylenically unsaturated monovalent organic radicals is greater than 1, the cured product would be a resinous material.

These monovalent organic radicals can be hydrocarbon radicals such as: alkyl radicals such as methyl, ethyl, cyclopentyl, propyl, isopropyl, hexyl, dodecyl, octadecyl, myricyl, 2-methyl-3-ethylhexyl, cyclohexyl, 2-methylcyclohexyl, 2-ethylhexyl and tertiarybutyl; alkenyl radicals such as vinyl, allyl, 1-butenyl, 1-hexenyl, cyclohexenyl, octadecenyl, 2-methylbutenyl-3 and 1,4-butadienyl; aryl radicals such as phenyl, anthracyl, tolyl, xylyl, xenyl, naphthyl, benzyl, phenylethyl, isopropylphenyl, 3-phenyldodecyl, styryl and methylnaphthyl; halogenated hydrocarbon radicals, such as haloalkyl, such as chloromethyl, bromoethyl, 3,3,3 - trifluoropropyl, 3,3,4,4,5,5,5 - pentafluoropentyl, 3,8-dichlorodecyl, 2-iodooctadecyl, chlorobutyl, 4,5 - dichlorohexyl, alpha - chloroethyl, alpha - gamma-dichloropropyl, iodomethyl, 3,6-dichlorohexyl, polychlorinated cyclohexyl, polychlorinated octadecyl, heptafluoropropyl and 3,3-dichloro-4-fluorobutyl; haloalkenyl such as 1,2,2-trifluorovinyl, chlorohexafluorocyclopentyl, 2 - chlorovinyl, 1,3 - dichloroallyl, 2 - (trifluoromethyl)-butenyl-3, chlorodifluorovinyl and 5-iodooctadecenyl-11; haloaryl radicals such as chlorophenyl, α,α,α-trifluorotolyl, hexafluoroxylyl, heptachloroxenyl, bromoxenyl, iodonaphthyl, dichlorobenzyl and perfluoroisopropylphenyl; and cyanoalkyl radicals such as cyanomethyl, β-cyanoethyl, γ-cyanopropyl, β-cyanopropyl, γ-cyanopentyl, ω-cyanopropyl, ω-cyanooctadecyl, and γ-cyanooctyl.

The silicon atoms of the silicon-containing polymers are linked by divalent radicals such as oxygen atoms; hydrocarbon radicals such as methylene, ethylene, butylene, isopropylene, octylene, octadecylene, phenylene, tolylene, 4,4'-biphenylene, 4,4'-diphenylether, p-xylylene, 4,4'-dimethylenediphenylether; and halohydrocarbon radicals such as dichloromethylene, tetrafluoroethylene, bromobutylene, dichlorophenylene, and 4,4'-dimethylene (2,2'-diiodo)diphenylether.

Any organosilicon polymer can be used in which there is at least 0.01 percent ethylenically unsaturated monovalent organic radicals based on the total number of monovalent organic radicals. These polymers can contain siloxane units such as dimethylsiloxane, monomethylsiloxane, trimethylsiloxane, diethylsiloxane, monoethylsiloxane, triethylsiloxane, ethyldimethylsiloxane, ethylmethylsiloxane, siliconeopentylmethylsiloxane, siliconeopentylethylsiloxane, bis-siliconeopentylsiloxane, phenylmethylsiloxane, phenylsiloxane, triphenylsiloxane, phenylethylsiloxane, diphenylsiloxane, siliconeopentylphenylsiloxane, monovinylsiloxane, α,α,α-trifluorotolylmethylsiloxane, chlorophenylmethylsiloxane, chloromethylmethylsiloxane, chloromethylsiloxane, bis-chloromethylsiloxane, bis-alphachloroethylsiloxane, alphachloroethylmethylsiloxane, bis-bromomethylsiloxane, octadecylbutylsiloxane, 6-chlorohexylmethylsiloxane, cyclohexylmethylsiloxane, 3,4,5 - trichloropentylphenylsiloxane, vinylmethylsiloxane, divinylsiloxane, allylmethylsiloxane, diallylsiloxane, hexenylphenylsiloxane, vinylethysioxane, monooctadecenylsiloxane, trifluorovinylmethylsiloxane, β - cyanoethylphenylsiloxane, xenylmethylsiloxane, chlorophenylmethylsiloxane, benzylmethylsiloxane, allyloctadecylsiloxane, allylsiloxane, dimethylvinylsiloxane, phenylmethylvinylsiloxane, monopropylsiloxane, dipropylsiloxane, propyphenylsiloxane, 3,3,3-trifluoropropylmethylsiloxane, mono - γ - chloropropylsiloxane, monocyclohexylsiloxane, monodichlorophenylsiloxane, phenyl - 3,3,3 - trifluoropropylsiloxane, monotolylsiloxane, monobenzylsiloxane, monocyanomethylsiloxane, and ω-cyanooctylmethylsiloxane.

Examples of organosilicon polymer units which contain divalent hydrocarbon and divalent halohydrocarbon radicals are

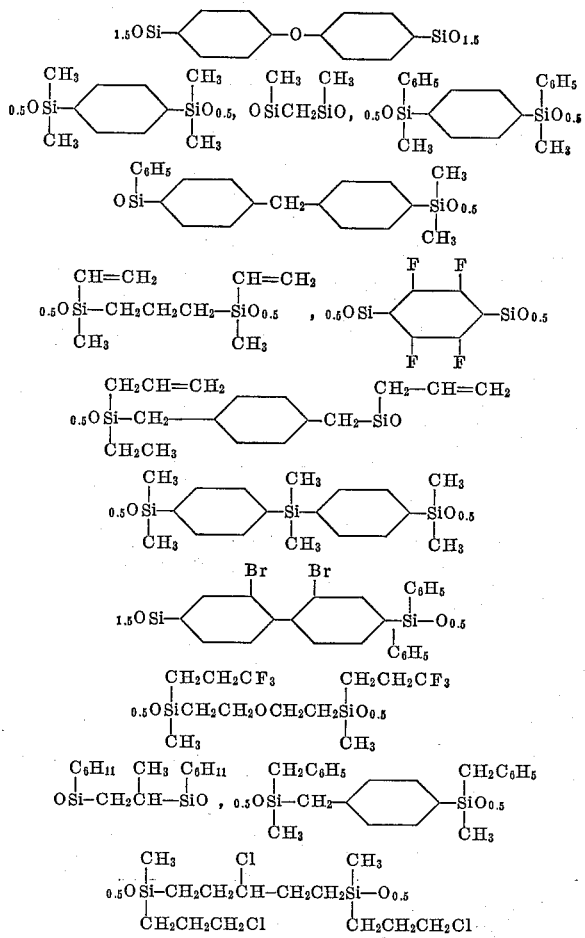

Other than the organosilicon polymer as described above, other additives and fillers can be added. Additives can be, for example, antioxidants, plasticizers, compression set additives, additives for improving the storage life of the unvulcanized compositions and other conventional additives used in silicone compositions. Conventional fillers used in silicone compositions can be used in the present compositions, such filler can be either untreated or treated with organosilanes or organosiloxanes. Examples of filler are, glass, diatomaceous earth, crushed quartz, clays, fume silica, precipitated silica, zirconium silicate, magnesium silicate, lithium silicates, aluminum silicates, iron oxide, magnesium oxide, titanium dioxide, calcium carbonate, metals, silicone resins and organic resins.

The art contains numerous references to ethylenically unsaturated organosilicon polymers which can be used in this invention. A number of references are listed below which include polymers, fillers and additives, within the scope of this invention:

U.S. Patents Nos.—2,456,783, 2,457,677, 2,480,822, 2,486,162, 2,561,429, 2,562,000, 2,714,099, 2,721,857, 2,723,964, 2,759,904, 2,803,619, 2,819,236, 2,831,010, 2,894,930, 2,906,766 2,917,530, 2,927,908, 2,970,122, 2,975,203, 2,982,757, 2,999,076, 3,006,878, 3,024,214, 3,032,530, 3,037,962, 3,050,492, 3,061,565, 3,065,201, 3,086,954, 3,160,601, 3,162,663, 3,183,209, 3,192,181, 3,202,634, 3,208,961 and 3,209,018; Canadian Patents Nos. 539,889, 546,861 and 677,876; British Patent No. 781,279, and U.S. patent application Ser. No. 431,159 filed Feb. 8, 1965.

The fillers and other additives as described in the foregoing patents are within the scope of this invention. The compositions as described, excluding any catalyst and within the scope of this invention can be used. The concept of using prior art catalyst in combination with the catalyst of the present invention is within the scope of this invention.

The catalyst (B) is a bibenzyl compound of the formula

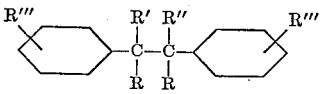

wherein R is a monovalent radical selected from a hydrogen atom, a

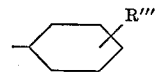

radical, a methyl radical or an ethyl radical, R' is a methoxy radical, an ethoxy radical, or an acetoxy radical, R'' is a hydrogen atom, a methoxy radical, an ethoxy radical or an acetoxy radical, and R''' is a hydrogen atom, a phenyl radical, a halogen atom, a methoxy radical, an ethoxy radical or an alkyl radical from 1 to 6 carbon atoms.

Examples of bibenzyl compounds within the scope of this invention are 4,4'-di-tert-butyl-α,α'-dimethoxy-α,α'-dimethylbibenzyl, α-methoxy-α,α'-diphenylbibenzyl, α,α'-dimethoxy-α,α'-dimethylbibenzyl, α,α'-dimethoxybibenzyl, α,α' - diacetoxy - 4,4'-dichloro - α,α' - dimethylbibenzyl, α,α' - diacetoxy - α,α' - dimethylbibenzyl, α,α' - diethoxy-4,4'-dimethoxy-α,α'-dimethylbibenzyl, 4,4',4'',4''-tetrachloro-α,α'-diethoxy-α,α'-diphenylbibenzyl, α - methoxy-α-ethyl-α'-phenylbibenzyl, α,α'-dimethoxy-α,α' - dimethyl-4,4'-diphenylbibenzyl and 4,4'-dibromo-α,α'-bis(p-bromophenyl)-α'-methyl-α-methoxybibenzyl.

The bibenzyl compounds can be prepared by a number of known methods which are described in the art. One of these methods which can be used is broadly reacting the desirable compounds in the presence of an organic peroxide, thus producing the desired product. Therefore, one can reflux a chlorobenzene solution of equimolar quantities of diphenyl methane and benzhydryl methylether in the presence of an organic peroxide such as di-tert-butyl peroxide, to obtain α-methoxy-α,α'-diphenyl-bibenzyl. The solvent can be distilled and the product can be recrystallized from methanol or mixtures of methanol and acetone. This method and others are more fully described in detail in Great Britain Patent No. 1,005,407, which is hereby fully incorporated by reference.

The compositions of this invention can be prepared in any conventional manner, such as by mixing, by milling, by solution in organic solvents, and the like. Although ordinary methods of preparation can be used, the advantages of using the bibenzyl compounds are that the polymers which are very high viscosity materials, solids, or crystalline can be mixed with the bibenzyl compounds at temperatures high enough to fluidize them such that the bibenzyl compound can be homogeneously dispersed or solubilized in the polymer. Fluidizing the polymers in this manner avoids using solvents and permits molding, handling and shaping of products without the chance of the product curing to an infusible mass before the processing is finished or, as is commonly known as scorching. Also, this permits large amounts of catalyzed fluidized polymers to be prepared for a long time prior to its use without concern about the pot life, even though the catalyzed fluidized polymers are at temperatures in excess of 100° C.

This invention, therefore, also relates to a method of vulcanizing an organosilicon composition comprising:

(I) Mixing (A) and (B) of the curable composition as described above at a temperature at which the curable composition is fluidized and at which the half life of the catalyst is greater than 3 minutes, and thereafter, (II) Heating the mixture above the temperature of (I) thereby vulcanizing the composition.

The silicon-containing polymers (A) can be mixed with a bibenzyl compound (B) as long as the silicon-containing polymers are fluidized. For the purposes of this invention, the term "fluidized" means a state of matter in which the molecules move freely on motion or can be caused to move throughout the composition by the process of milling. This means that solvents can be used to fluidize a silicon-containing polymer as well as having the silicon-containing polymer in a "molten state." For the purposes of this invention, the term "molten" refers to the polymer in a fluidized state without the assistance of a solvent. The silicon-containing polymers should be in a fluidized state to insure a homogeneous mixture of the bibenzyl compound and the polymer.

The bibenzyl compounds decompose into free radicals with the liberation of gaseous by-products such as methane, hydrogen, ethane, depending on the particular bibenzyl compound being decomposed. The rate of the decomposition into free radicals is directly proportional to the amount of the gaseous product formed. This rate of decomposition can, therefore, be measured by observing the amount of gaseous products being evolved. At different temperatures, the rate of decomposition will vary and the length of the time for any given amount of any given bibenzyl compound to decompose will thus also vary. The maximum temperature allowable at which any given bibenzyl compound can be mixed with a silicon-containing polymer will be determined by the rate of decomposition of the bibenzyl compound and the length of the processing time one desires before any appreciable vulcanization will take place. The best way of determining this maximum allowable temperature for mixing (A) and (B) is by determining the half life of any particular bibenzyl compound at the temperature desired to be used in the processing. One should not use temperatures above the temperature at which the half life of the bibenzyl is less than 3 minutes, preferably the half life of the bibenzyl compound should be at least 5 minutes. This half life permits the worker enough time to use the composition before any appreciable curing has taken place. For the purposes of this invention, the term "half life" means that length of time, at a given temperature for a given bibenzyl compound, for one half of a given amount of bibenzyl compound to decompose. For the best results, the temperature used in mixing (A) and (B) should be such that the half life is at least 10 hours to insure a minimum of vulcanization and to permit the user an adequate length of time to work with the composition and to provide a satisfactory pot time for use over long periods of time such as on a production line in which electric motors are dipped to coat them with a silicone resin. Under normal working conditions, one can mix (A) and (B) at temperatures up to 125° C. without any problems and mixing at 150° C. can be done with all the bibenzyl compounds. For certain bibenzyl compounds, temperatures up to as high as 225° C. can be used for mixing. The half lives can be determined by the method of observing the amount of gaseous product evolved at a given temperature for a given period of time. This method is described in greater detail by Great Britain Patent No. 1,005,407 as well as elsewhere in the literature.

The compositions of this invention have the advantages of being melted, molded, shaped and processed in any way at temperatures ranging from 150° C. to 225° C. without vulcanizing. The compositions can, therefore, be used for injection molding, coating, laminating and molding at high temperatures without the use of solvents. These and many additional advantages will be apparent to those skilled in the art.

The method of this invention has the advantages of mixing the ingredients in the presence of the vulcanization catalyst at the same time without the ingredients vulcanizing. Solvents are unnecessary, but can be used, during the preparation. The method and composition are, therefore, safe to use because the use of volatile, toxic, explosive and inflammable solvents is not necessary.

The following examples are illustrative only and are not to be construed as limiting the invention which is properly delineated in the appended claims.

*Example 1*

(A) A mixture of 100 parts by weight of a polydimethylsiloxane gum containing 0.25 mol percent methylvinylsiloxane units and 37 parts by weight silica was milled on a cold two-roll mill with 0.50 part by weight of 2,4-dichlorobenzoylperoxide.

(B) The same mixture as described in (A) was prepared except that 0.581 part by weight of α-methoxy-α,α'-diphenylbibenzyl was used instead of the 2,4-dichlorobenzoylperoxide.

(C) The same mixture as described in (A) was prepared except that 0.431 part by weight of α,α'-dimethoxy-α,α'-dimethylbibenzyl was used instead of the 2,4-dichlorobenzoylperoxide.

(D) The same mixture as described in (A) was prepared except that 0.43 part by weight of α,α'-diethyl-α,α'-dimethylbibenzyl was used instead of the 2,4-dichlorobenzoylperoxide.

(E) A composition the same as (D) was prepared except 0.86 part by weight of the α,α'-diethyl-α,α'-dimethylbibenzyl was used.

(F) Compositions (B), (C) and (D) were repeated except that a polydimethylsiloxane gum containing no vinyl was used.

Samples (A), (D), (E) and (F) are for comparison purposes only.

Each of the samples were compression molded according to the following schedules:

| Sample | Time, (min.) | Temperature, °C. | Results |
| --- | --- | --- | --- |
| (A) | 5 | 116 | Vulcanized. |
| (B) | 5 | 218 | Do. |
| (C) | 5 | 254 | Do. |
|  | 5 | 284 | Do. |
| (D) | 5 | 250 | No vulcanization. |

Sample (D) was then molded at temperatures beginning with 150° C., holding at this temperature and then increasing the temperature according to the following schedule:

| Sample | Time, (min.) | Temperature, °C. | Results |
| --- | --- | --- | --- |
| D) | 15 | 150 | No vulcanization. |
|  | 5 | 171 | Do. |
|  | 5 | 200 | Do. |
|  | 5 | 225 | Do. |
|  | 5 | 250 | Do. |
|  | 5 | 400 | Do. |

The only results shown by Sample (D) was that some volatile materials were given off.

Sample (E) was compression molded for 5 minutes at 250° C. No vulcanization occurred.

The samples of (F) were compression molded according to the conditions of (B), (C) and (D) which were 5 minutes respectively at 218° C., 284° C. and 250° C. No vulcanization took place in any of the samples.

Samples (A), (B) and (C) vulcanized at the molding temperatures and the properties of the samples are as follows:

| Sample | Durometer | Tensile, p.s.i. | Elongation, Percent | Die B, Tear, p.s.i. |
| --- | --- | --- | --- | --- |
| (A) | 43 | 760 | 480 | 54 |
| (B) | 38 | 710 | 550 | 66 |
| (C) | 37 | 1,050 | 700 | 57 |

Each of the samples were then cured for 4 hours at 250° C. and for 7 days at 250° C. The results are as follows:

CURED FOR 4 HOURS AT 250° C.

| Sample | Durometer | Tensile, p.s.i. | Elongation, Percent | Die B, Tear, p.s.i. |
|---|---|---|---|---|
| (A) | 46 | 1,170 | 500 | 62 |
| (B) | 40 | 1,070 | 600 | 72 |
| (C) | 42 | 990 | 580 | 71 |

CURED FOR 7 DAYS AT 250° C.

| Sample | Durometer | Tensile, p.s.i. | Elongation, Percent |
|---|---|---|---|
| (A) | 59 | 740 | 230 |
| (B) | 62 | 890 | 230 |
| (C) | 61 | 760 | 210 |

*Example 2*

A mixture of 100 parts by weight of a crystalline solid composed of a silphenylene polymer of the units

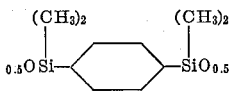

and 0.28 mol percent of methylvinylsiloxane units, 35 parts by weight silica and 1.66 parts by weight $\alpha,\alpha'$-dimethoxy-$\alpha,\alpha'$-dimethylbibenzyl was prepared by milling the ingredients on a hot two-roll mill without scorching. The milling temperature was about 150° C. The unvulcanized milled mixture was then compression molded for 5 minutes at 275° C. The properties of the molded mixture was a rubbery solid with 2020 p.s.i. tensile strength and 533 p.s.i. die B tear strength. The molded rubbery solid was then cured for 4 hours at 250° C. and the resulting properties were 2800 p.s.i. tensile strength and 604 p.s.i. die B tear strength.

*Example 3*

When the following bibenzyl compounds are substituted for $\alpha$-methoxy-$\alpha,\alpha'$-diphenylbibenzyl of Example 1, (B), equivalent results are obtained:
 (1) $\alpha,\alpha'$-Diacetoxy-$\alpha,\alpha'$-dimethylbibenzyl,
 (2) $\alpha,\alpha'$-Dimethoxybibenzyl,
 (3) 4,4'-ditertiarybutyl - $\alpha,\alpha'$-dimethoxy-$\alpha,\alpha'$-dimethylbibenzyl,
 (4) 4,4'-Dimethoxy - $\alpha,\alpha'$-diethoxy - $\alpha,\alpha'$-dimethylbibenzyl,
 (5) $\alpha,\alpha'$-Dimethoxy-$\alpha,\alpha'$-diphenylbibenzyl,
 (6) 4,4'-diphenyl - $\alpha,\alpha'$-dimethoxy - $\alpha,\alpha'$-dimethylbibenzyl.

*Example 4*

When a mixture is prepared according to Example 1 (B) wherein the ingredients are 100 parts by weight of a polydimethylsiloxane gum having 0.5 mol percent allylmethylsiloxane units, 50 parts by weight of silica and 2 parts by weight 4,4'-dichloro - $\alpha,\alpha'$-diacetoxy - $\alpha,\alpha'$-dimethylbibenzyl and cured according to Example 1 (B), a rubbery solid is obtained.

*Example 5*

When a composition is prepared and cured according to Example 2, except that one of the following polymers replaces the silphenylene polymer, a rubbery solid is obtained.
 (1) A polymer composed of 95 mol percent of

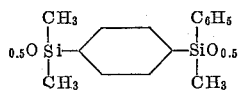

units, 4.8 mol percent of $(C_6H_5)(CH_3)SiO$ units and 0.2 mol percent $(CH_2=CH)_2SiO$ units,
 (2) A polymer composed of 40 mol percent of

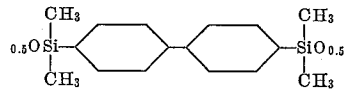

units, 40 mol percent of $(C_6H_5)_2SiO$ units, 5 mol percent of $CH_3SiO_{1.5}$ units, 0.03 mol percent of $(CH_2=CHCH_2)(CH_3)_2SiO_{0.5}$ units and 14.97 mol percent of $(CH_3)_2SiO$ units,
 (3) A polymer composed of 0.5 mol percent of

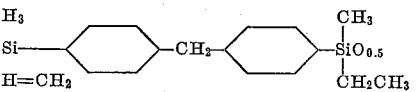

units and 99.5 mol percent $(CH_3)_2SiO$ units,
 (4) A polymer composed of 20 mol percent of $(CH_3CH_2)(CH_3)SiO$ units, 79.6 mol percent of

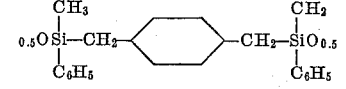

units and 0.4 mol percent of $CH_2=CHCH_2CH_2(C_6H_5)_2SiO_{0.5}$ units,
 (5) A polymer composed of 10 mol percent of

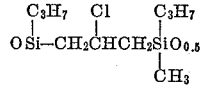

units, 75 mol percent of

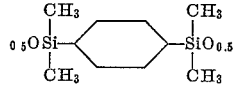

units, 10 mol percent of $(CH_3)_2SiO$ units and 5 mol percent of $(CH_2=CH)(CH_3)SiO$ units.

*Example 6*

When a mixture of 100 parts by weight of a siloxane having the average formula

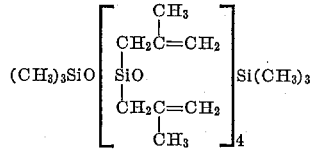

and 5 parts by weight of $\alpha,\alpha'$-dimethoxybibenzyl is prepared and heated to 250° C. for 5 hours, a very hard material is obtained.

*Example 7*

When a mixture is prepared by rapidly blending at 288° C., 100 parts by weight of a copolymer composed of 50 mol percent of $(C_6H_5CH_2)(C_6H_5)SiO$ units and 50 mol percent of

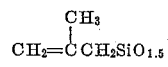

with 2 parts by weight of 4,4'-di-tert-butyl-$\alpha,\alpha'$-dimethoxy-$\alpha,\alpha'$-dimethylbibenzyl, a hard resinous solid is obtained when the mixture is heated to 300° C. for one hour.

*Example 8*

A resinous solid is obtained when a mixture of 100 parts by weight of a copolymer composed of 25 mol percent of phenylvinylsiloxane units and 75 mol percent of phenylmethylsiloxane units endblocked with divinylmethylsiloxane units and 1 part by weight 4,4'-dichloro-$\alpha,\alpha'$-diacetoxy - $\alpha,\alpha'$-dimethylbibenzyl is heated to 300° C. for 20 minutes.

Example 9

A silicone rubber is prepared when 100 parts by weight of an organopolysiloxane copolymer consisting of 7.5 mol percent phenylmethylsiloxane units, 0.142 mol percent methylvinylsiloxane units and 92.358 mol percent dimethylsiloxane units, 70 parts by weight of a fume silica filler, 2 parts by weight iron oxide, 0.15 part by weight of boric acid, and 0.9 part by weight of α,α'-diacetoxy-α,α'-dimethylbibenzyl are mixed on a 125° C. two-roll mill molded for 5 minutes at 200° C. and then cured 24 hours at 250° C.

Example 10

A silicone rubber is prepared when 100 parts by weight of a copolymeric organosiloxane comprising 85 mol percent dimethylsiloxane units, 10 mol percent phenylmethylsiloxane units, 4.8 mol percent α,α,α-trifluorotolylmethylsiloxane and 0.2 mol percent methylvinylsiloxane units, 35 parts by weight of a fume silica filler, 0.12 part of iron as ferric octoate and 3 parts by weight of α,α'-diphenyl-α,α'-dimethoxybibenzyl is mixed by milling, molded for 5 minutes at 175° C. and then cured for 20 hours at 120° C.

Example 11

When 10 parts by weight of a copolymer of 89 mol percent dimethylsiloxane, 10 mol percent phenylvinylsiloxane and 1 mol percent trimethylsiloxane having a viscosity of 3,240 cs. at 25° C., 100 parts by weight of a dimethylpolysiloxane gum, 35 parts by weight of a fume silica, 15 parts by weight of diatomaceous earth and 2.8 parts by weight of α,α'-dimethoxy-α,α'-dimethylbibenzyl are milled on a 150° C. mill, vulcanized for 5 minutes at 180° C. and then cured for 24 hours at 280° C., a silicone rubber is obtained.

Example 12

A silicone rubber is prepared when 100 parts by weight of a copolymeric organopolysiloxane gum having 92.36 mol percent dimethylsiloxane units, 0.14 mol percent methylvinylsiloxane units and 7.5 mol percent phenylmethylsiloxane units, 20 parts by weight of a copolymer fluid having a viscosity of 111 cs. at 25° C. and having a composition of 28 mol percent dimethylsiloxane units, 10 mol percent methylvinylsiloxane units, 50 mol percent phenylmethylsiloxane units and 12 mol percent trimethylsiloxane units, 5 parts by weight of a copolymer fluid having a viscosity of 658 cs. at 25° C. and composed of 89 mol percent dimethylsiloxane units, 10 mol percent methylvinylsiloxane units and 1 mol percent trimethylsiloxane units, 35 parts by weight of a fume silica, and 5 parts by weight of α,α'-diphenyl-α-methoxybibenzyl is milled, vulcanized for 20 minutes at 150° C. and then cured for 3 hours at 175° C.

Example 13

A resinous product is obtained when 40 grams of

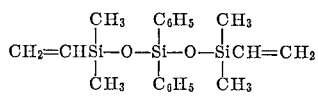

is mixed with 0.004 gram of α,α'-dimethoxybibenzyl and thereafter heated to 170° C. for 4 hours.

Example 14

A resin is prepared by mixing 75 parts by weight of a copolymer having 50 mol percent phenylvinylsiloxane units and 50 mol percent phenylmethylsiloxane units, 25 parts by weight of symdimethyldiphenyldivinyldisiloxane and 2 parts by weight of 4,4'-diphenyl-α,α'-dimethoxy-α,α'-dimethylbibenzyl. This mixture is cured to a high-strength material by heating for 6 hours at 220° C.

Example 15

A resin is obtained when 50 parts by weight of

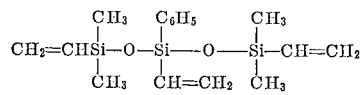

50 parts of $(CH_3)_2(C_6H_5)SiCH_2CH=CH_2$ and 4.4 parts by weight of 4,4'-dichloro-α,α'-di(p-chlorophenyl)α,α'-diethoxybibenzyl is mixed. This mixture cures to a tough material when heated for 1 hour at 300° C.

Example 16

A silicone rubber is prepared by milling on a two-roll rubber compounding mill, 100 parts by weight of an organopolysiloxane gum consisting of 99.5 mol percent 3,3,3-trifluoropropylmethylsiloxane units and 0.5 mol percent methylvinylsiloxane units, 4.5 parts by weight of a hydroxy-endblocked dimethylpolysiloxane fluid containing 3.15 percent by weight of silicon-bonded hydroxyl radicals, 30 parts by weight of a precipitated silica, 25 parts by weight of polytetrafluoroethylene and 6 parts by weight of 4,4'-dichloro-α,α'-dimethoxy-α,α'-dimethylbibenzyl. This mixture is cured by heating for 24 hours at 236° C.

Example 17

A silicone rubber stock was prepared by milling at 145° C. the following mixture on a two-roll mill: 100 parts by weight of 3,3,3-trifluoropropylmethylpolysiloxane having a Williams plasticity of 0.120 inch, 5 parts by weight of a hydroxy-endblocked symtetrakis-3,3,3-trifluoropropyltetramethyltetrasiloxane, 30 parts by weight of a fume silica, 20 parts by weight of diatomaceous earth, 5 parts by weight of a phenylmethylvinylsiloxy-endblocked copolymer consisting of 5 mol percent of phenylvinylsiloxane units, 10 mol percent of dipropylsiloxane units, 5 mol percent of cyclohexylmethylsiloxane units, 40 mol percent phenylmethylsiloxane units and 40 mol percent dimethylsiloxane units having a viscosity of 700,000 cs. at 25° C., and 2 parts by weight of α,α'-dimethoxy-α,α'-dimethylbibenzyl.

Example 18

When the silphenylene polymer of Example 2 is replaced by a hydroxyl-endblocked polymer of the units $_{0.5}O(CH_3)_2SiC_2H_4Si(CH_3)_2O_{0.5}$ containing 0.4 mol percent methylvinylsiloxane units, equivalent results are obtained when the milling is done at 270° C. and thereafter curing at 290° C. for 45 minutes.

Example 19

When a copolymer having 60 mol percent

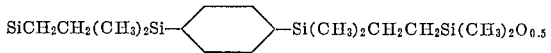

units, 25 mol percent $(C_6H_5)(CH_3)SiO$ units, 5 mol percent $(C_6H_5)_2(CH_3)SiO_{0.5}$ units and 10 mol percent $$(CH_2=CH)(CH_3)SiO$$

units replaces the polymer of Example 18, equivalent results are obtained.

Example 20

When the dimethylpolysiloxane gum of Example 1, (B) is replaced by a copolymer consisting of 40 mol percent $(NCCH_2CH_2CH_2)(CH_3)SiO$ units, 58 mol percent $(CH_3)_2SiO$ units and 2 mol percent $$[CH_2=CH(CH_2)_6](CH_3)SiO$$

units, equivalent results are obtained.

That which is claimed is:
1. A curable composition consisting essentially of
 (A) a silicon-containing polymer having per silicon atom an average of at least 1 monovalent organic radical wherein each of said monovalent organic radicals is selected from the group consisting of hydrocarbon radicals, halogenated hydrocarbon radicals and cyanoalkyl radicals, the silicon atoms being linked by divalent radicals selected from the group consisting of oxygen atoms, hydrocarbon radicals and halogenated hydrocarbon radicals and at least 0.01 percent of the total monovalent organic radicals being ethylenically unsaturated, and (B) a catalyst in an amount of at least 0.01 weight percent based on the weight of (A) of the formula

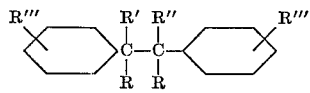

wherein each

R is a monovalent radical individually selected from the group consisting of a hydrogen atom, a

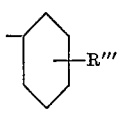

radical, a methyl radical and an ethyl radical,

R' is a monovalent radical selected from the group consisting of a methoxy radical, an ethoxy radical and an acetoxy radical, R'' is a monovalent radical selected from the group consisting of a hydrogen atom, a methyl radical, a methoxy radical, an ethoxy radical and an acetoxy radical, and each R''' is a monovalent radical individually selected from the group consisting of a hydrogen atom, a phenyl radical, a halogen atom, a methoxy radical, an ethoxy radical and an alkyl radical of from 1 to 6 carbon atoms.

2. The composition according to claim 1 wherein a filler is present.

3. The composition according to claim 1 wherein the silicon-containing polymer is a diorganopolysiloxane.

4. The composition according to claim 3 wherein the monovalent organic radicals of the diorganopolysiloxane are selected from the group consisting of methyl, phenyl and vinyl.

5. The composition according to claim 4 wherein the monovalent organic radicals of the diorganopolysiloxane are methyl and vinyl.

6. The composition according to claim 1 wherein the silicon-containing polymer is a copolymer wherein the silicon atoms are linked by divalent oxygen atoms and divalent hydrocarbon radicals.

7. The composition according to claim 6 wherein the monovalent organic radicals of the copolymer are methyl and vinyl and the divalent hydrocarbon radicals are phenylene radicals.

8. The composition according to claim 1 wherein the catalyst is selected from the group of $\alpha,\alpha'$-dimethoxy-$\alpha,\alpha'$-dimethylbibenzyl and $\alpha$-methoxy-$\alpha,\alpha'$-diphenylbibenzyl.

9. The composition according to claim 5 wherein the catalyst is $\alpha,\alpha'$-dimethoxy-$\alpha,\alpha'$-dimethylbibenzyl.

10. The composition according to claim 7 wherein the catalyst is $\alpha,\alpha'$-dimethoxy-$\alpha,\alpha'$-dimethylbibenzyl.

11. A method of vulcanizing an organosilicon composition consisting essentially of (I) mixing (A) and (B) of the curable composition of claim 1 at a temperature at which the curable composition is fluidized and at which the half life of the catalyst is greater than 3 minutes, and thereafter, (II) heating the mixture above the temperature of (I) thereby vulcanizing the composition.

12. The method in accordance with claim 11 wherein the temperature is such that the half life is at least 5 minutes.

13. The method in accordance with claim 11 wherein the temperature of mixing is at least 150° C.

14. The method in accordance with claim 13 wherein the catalyst is $\alpha,\alpha'$-dimethoxy-$\alpha,\alpha'$-dimethylbibenzyl.

References Cited

UNITED STATES PATENTS

| | | | |
|---|---|---|---|
| 3,066,115 | 11/1962 | Smith et al. | 260—45.5 |
| 3,125,546 | 3/1964 | Pinner et al. | 260—45.5 |
| 3,183,209 | 5/1965 | Hartung et al. | 260—46.5 |
| 3,202,634 | 8/1965 | Merker | 260—46.5 |
| 3,278,502 | 10/1966 | Huyser et al. | 260—80 |

DONALD E. CZAJA, Primary Examiner.

M. I. MARQUIS, Assistant Examiner.